US010956743B1

(12) United States Patent
Li et al.

(10) Patent No.: US 10,956,743 B1
(45) Date of Patent: Mar. 23, 2021

(54) SHARED AUGMENTED REALITY SYSTEM

(71) Applicant: Snap Inc., Santa Monica, CA (US)

(72) Inventors: David Li, London (GB); Isac Andreas Müller Sandvik, London (GB); Qi Pan, London (GB); Rastan Boroujerdi, Hermosa Beach, CA (US); Kevin Yimeng Hong, Los Angeles, CA (US); Peng Deng, Playa Vista, CA (US); Piers George Cowburn, London (GB); Jonathan Tang, Los Angeles, CA (US); Junjie Wei, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/833,087

(22) Filed: Mar. 27, 2020

(51) Int. Cl.
*G06K 9/00* (2006.01)
*G06T 7/73* (2017.01)
*G06T 19/00* (2011.01)
*G09G 3/00* (2006.01)
*G06F 3/01* (2006.01)

(52) U.S. Cl.
CPC .......... *G06K 9/00671* (2013.01); *G06F 3/011* (2013.01); *G06T 7/74* (2017.01); *G06T 19/006* (2013.01); *G09G 3/003* (2013.01); *G09G 2340/14* (2013.01); *G09G 2354/00* (2013.01)

(58) Field of Classification Search
CPC .......... G06F 2111/18; G06F 3/011–015; G06F 3/0481; G06F 3/04817; G06F 9/4443; G06F 3/04847; G06F 11/3664; G06K 9/00664–00704; G06T 19/00; G06T 17/00; G06T 7/00; G06T 19/006; G06T 2215/16; H04N 5/272; H04N 2201/3245; A63F 13/10
See application file for complete search history.

(56) References Cited

U.S. PATENT DOCUMENTS

| 10,515,480 | B1 * | 12/2019 | Hare ..................... G06T 17/20 |
| 2018/0176483 | A1 * | 6/2018 | Knorr ................. H04N 5/2723 |
| 2020/0250858 | A1 * | 8/2020 | Li .......................... G06T 11/60 |
| 2020/0265548 | A1 * | 8/2020 | Burleigh .............. G06T 15/005 |

* cited by examiner

*Primary Examiner* — Todd Buttram
(74) *Attorney, Agent, or Firm* — Schwegman Lundberg & Woessner, P.A.

(57) ABSTRACT

An augmented reality system to perform operations that include: accessing image data at a client device; determining a position of a user of the client device based on the image data; causing display of a projection that extends from the position of the user upon a presentation of the image data at the client device; detecting an intersection of the projection and a surface of an object; generating a request that includes an identification of the portion of the surface of the object at the client device; and presenting the portion of the surface of the object based on the graphical property of the projection at the client device in response to the request that includes the identification of the portion of the surface of the object.

20 Claims, 10 Drawing Sheets

400

```
┌─────────────────────────────────────────────────────────────┐
│  ACCESSING IMAGE DATA AT A CLIENT DEVICE, THE IMAGE DATA    │
│ COMPRISING A SET OF IMAGE FEATURES THAT DEFINE A SURFACE OF │
│                         AN OBJECT                            │
│                            402                               │
└─────────────────────────────────────────────────────────────┘
                              │
                              ▼
┌─────────────────────────────────────────────────────────────┐
│  DETERMINING A POSITION OF A USER OF THE CLIENT DEVICE      │
│           BASED ON THE SET OF IMAGE FEATURES                │
│                         404                                  │
└─────────────────────────────────────────────────────────────┘
                              │
                              ▼
┌─────────────────────────────────────────────────────────────┐
│  CAUSING DISPLAY OF A PROJECTION THAT EXTENDS FROM THE      │
│  POSITION OF THE USER UPON A PRESENTATION OF THE IMAGE DATA │
│    AT THE CLIENT DEVICE, THE PROJECTION HAVING A TRAJECTORY │
│                            406                               │
└─────────────────────────────────────────────────────────────┘
                              │
                              ▼
┌─────────────────────────────────────────────────────────────┐
│ DETECTING AN INTERSECTION OF THE PROJECTION AND A PORTION   │
│    OF THE SURFACE OF THE OBJECT BASED ON THE TRAJECTORY     │
│                            408                               │
└─────────────────────────────────────────────────────────────┘
                              │
                              ▼
┌─────────────────────────────────────────────────────────────┐
│ GENERATING A REQUEST THAT INCLUDES AN IDENTIFICATION OF THE │
│   PORTION OF THE SURFACE OF THE OBJECT AT THE CLIENT DEVICE │
│                            410                               │
└─────────────────────────────────────────────────────────────┘
                              │
                              ▼
┌─────────────────────────────────────────────────────────────┐
│ PRESENTING THE PORTION OF THE SURFACE OF THE OBJECT BASED   │
│ ON THE GRAPHICAL PROPERTY OF THE PROJECTION AT THE CLIENT   │
│                          DEVICE                              │
│                            412                               │
└─────────────────────────────────────────────────────────────┘
```

ASSIGNING A GRAPHICAL PROPERTY FROM AMONG A PLURALITY OF GRAPHICAL PROPERTIES TO A USER PROFILE ASSOCIATED WITH THE CLIENT DEVICE
602

CAUSING DISPLAY OF THE PROJECTION BASED ON THE GRAPHICAL PROPERTY
604

700

RECEIVING, AT THE FIRST CLIENT DEVICE, LOCATION DATA THAT IDENTIFIES A LOCATION OF A SECOND CLIENT DEVICE, THE LOCATION DATA INDICATING A HEADING OF THE SECOND CLIENT DEVICE
702

CAUSING DISPLAY OF MEDIA CONTENT AT THE FIRST CLIENT DEVICE, THE MEDIA CONTENT COMPRISING A SECOND GRAPHICAL PROPERTY ASSOCIATED WITH THE SECOND CLIENT DEVICE
704

*FIG. 7*

SHARED AUGMENTED REALITY SYSTEM

TECHNICAL FIELD

Embodiments of the present disclosure relate generally to mobile computing technology and, more particularly, but not by way of limitation, to systems for generating and causing display of augmented reality media.

BACKGROUND

Augmented reality (AR), is a live direct or indirect view of a physical, real-world environment whose elements are augmented by computer-generated sensory inputs.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart depicting a method of presenting a shared augmented reality interface, according to certain example embodiments.

FIG. 7 is a flowchart depicting a method of presenting augmented reality content in a shared augmented reality interface, according to certain example embodiments.

DETAILED DESCRIPTION

Figure 1:
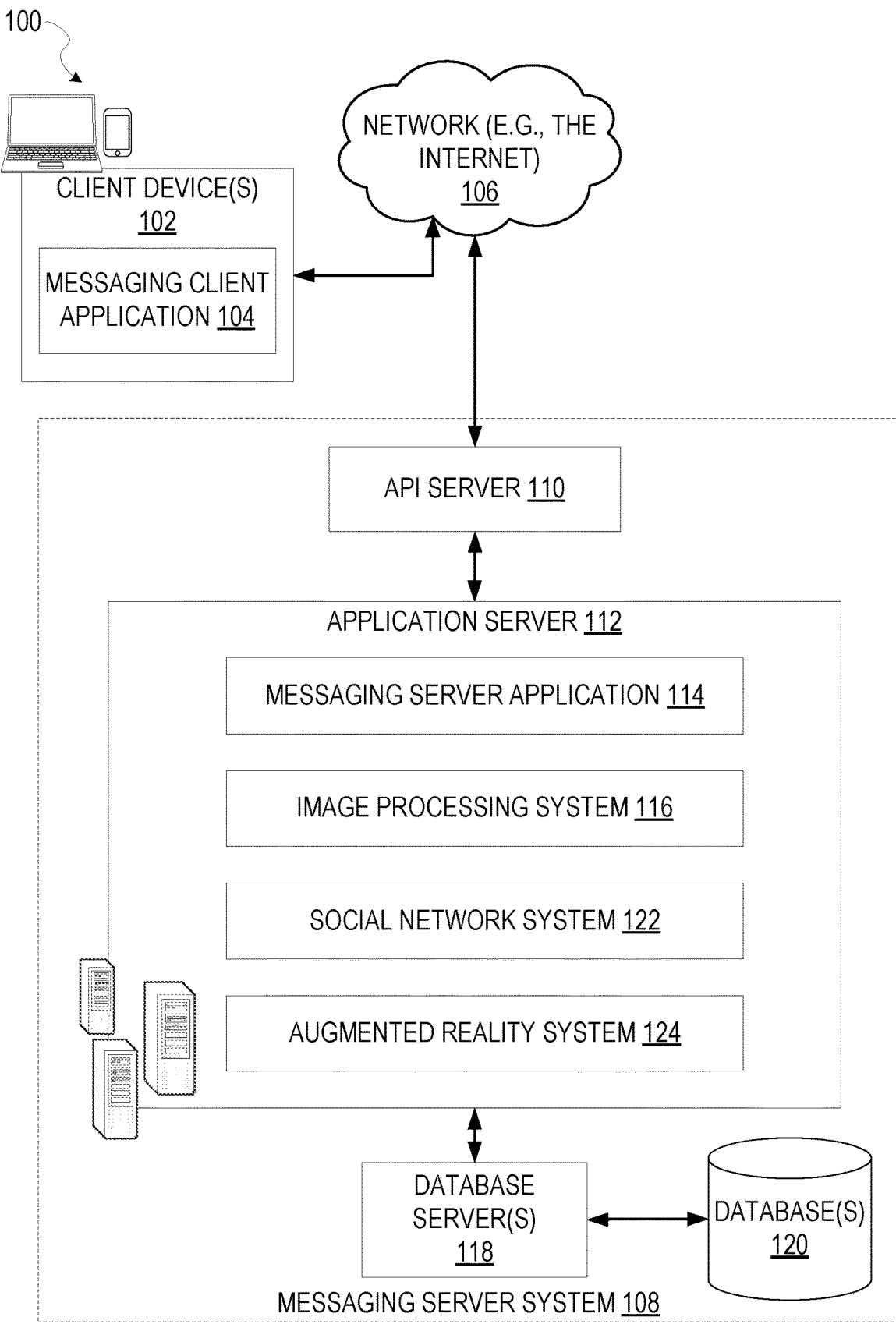
FIG. 1 is a block diagram showing an example messaging system for exchanging data (e.g., messages and associated content) over a network in accordance with some embodiments, wherein the messaging system includes an augmented reality system.

As discussed above, AR systems provide users within graphical user interfaces (GUI) to display a live direct or indirect view of a physical, real-world environment, wherein elements of the view are augmented by computer-generated sensory inputs. For example, an AR interface may present media content at positions within a display of a view of a real-world environment, such that the media content appears to interact with elements in the real-world environment. Certain example embodiments discussed herein therefore provide an AR system to generate and present a "shared" AR experience, wherein multiple users may take part in the same AR session in real-time.

Accordingly, a shared AR system is disclosed which performs operations that include: accessing image data at a client device, the image data comprising a set of image features, the set of image features defining a surface of an object; determining a position of a user of the client device based on the set of image features; causing display of a projection that extends from the position of the user upon a presentation of the image data at the client device, the projection comprising a graphical property and having a trajectory based on the position of the user of the client device; detecting an intersection of the projection and the surface of the object based on the trajectory, the intersection corresponding with a portion of the surface of the object; generating a request that includes an identification of the portion of the surface of the object at the client device; and presenting the portion of the surface of the object based on the graphical property of the projection at the client device in response to the request that includes the identification of the portion of the surface of the object.

In some embodiments, the display of the projection may be responsive to a user input received at the client device. For example, a user of the client device may provide a tactile input at the client device, wherein the tactile input comprises a selection of a graphical icon, or a point within the presentation of the image data at the client device. Responsive to receiving the input, the shared AR system may present a projectile that extends from a position of the user within the presentation of the image data at the client device. As an illustrative example, the projectile may be presented as a stream of paint extending from a location within the presentation of the image data at the client device, such that the user of the client device may change a trajectory of the projectile by moving and re-orienting the client device. A user may therefore "paint" objects detected in a presentation of image data at the client device by pointing the projectile (i.e., paint stream) presented at the client device at the objects. In some embodiments, only some portions and specific areas of an area (i.e., a surface of a building) may be augmented with AR paint.

In some embodiments, the objects may include other virtual (i.e., AR) objects presented within the presentation of the image data at the client device. For example, in such embodiments, the shared AR system may detect AR content displayed within the presentation of the image data based on location data from the client device, and location data associated with the AR content. The user may thereby paint the AR content displayed within the presentation of the image data by pointing the projectile extending from the client device to the object.

In some embodiments, the shared AR system may assign a user of the client device to a "team" responsive to detecting the client device associated with the user at a location. Detection of the client device at a location may be based on a geo-fence that encompasses the location, location data extracted from the client device, or based on the detection of landmarks associated with the location within image data captured or displayed at the client device. The team may correspond with a graphical property, such as a color or pattern (or color and pattern), wherein the projection (i.e., paint) may be presented at the client device based on the corresponding graphical property.

In some embodiments, a user of the shared AR system may provide an input that selects a team or graphical property (i.e., paint color, paint pattern). For example, responsive to detecting the client device at a location (i.e., the client device transgresses a boundary of a geo-fence), the shared AR system may cause display of a menu element that includes a display of one or more graphical properties from which the user may select, or a display of one or more teams from which the user may select. The user may then provide an input that selects a team or graphical property from the menu element, and in response the shared AR system may assign the graphical property (or team) to a user profile associated with the user.

In some embodiments, the user may paint an object depicted in image data within a presentation of the image data at a client device by directing the display of the projectile extending from the client device at the object, wherein the object has a corresponding total area based on a surface of the object. The shared AR system may determine a ratio of an area of a portion of the object painted by the user to the total area of the surface of the object in order to calculate a score to be presented to the user at the client device. For example, as the user paints the object, an indication of a coverage of the object by the user may be displayed at the client device of the user. The indication may be presented as a numerical value (i.e., 25, 25%), or as a graphical indicator that presents the value based on a visual indication (i.e., a bar).

In some embodiments, objects painted by the user in the presentation of the image data at the client device of the user may be tagged to the location, such that other users may be able to see what the user has painted. For example, a first user may paint a building at a location within a presentation of image data at a first client device, such that the building appears to be covered in a first color of paint. A second user may then see the building being painted in real-time through a second client device.

In some embodiments, a user of the shared AR system may provide an input that selects an "eraser" function, and wherein selection of the eraser function enables the user to remove "paint" applied to a surface within the presentation of the image data at a client device. In such embodiments, the user may erase the AR content presented along surfaces of objects within an AR environment by "painting" the surfaces with an eraser projectile that extends from a position of the user at the client device. Accordingly, a user may "erase" paint applied by another user.

Certain embodiments of the shared AR system may include a game, wherein players of the game (i.e., users of the shared AR system) are incented to "paint" as much of a location with their corresponding paint color (i.e., graphical property that corresponds with their team). The game may be "won" by the user, or team of users, that paint the largest percentage of the objects in a location over a predefined period of time (i.e., 5 minutes), or based on which user, or team of users, completes painting all objects (or a set of objects) before the other user or team of users. Progress may be presented at the client devices that correspond with the players of the game, wherein the progress may be indicated as a score.

Users may be recruited onto teams based on proximity to a geographic location, as well as user attributes of the users. For example, upon detecting a client device of a user at a location, the shared AR system may designate the user to a team from among a plurality of teams, wherein each team has a corresponding identifier, such as a color (i.e., a graphical property). The user may then paint objects within a presentation of image data at their client device with the identifier (i.e., color) associated with their corresponding team.

In some embodiments, a game executed by the shared AR system may notify players of specific objects to find and "paint." The specific objects may include landmarks including but not limited to buildings, signs, and statues. For example, responsive to detecting the client device at a location, the shared AR system may identify one or more objects based on the location. For example, the share AR system may maintain a repository that includes a listing of objects at a given location.

The shared AR system may then notify the players of the objects to be identified and painted. Users of the shared AR system may then be given a period of time in which to paint as many of the objects as they can before the period of time expires. Progress may be visible to the users as a shared AR experience.

FIG. 1 is a block diagram showing an example messaging system 100 for exchanging data (e.g., messages and associated content) over a network. The messaging system 100 includes one or more client device 102 which host a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a shared AR system 124. The shared AR system 124 is configured to generate and present AR content at the client device 110. Further details of the shared AR system 124 can be found in FIG. 3 below.

The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
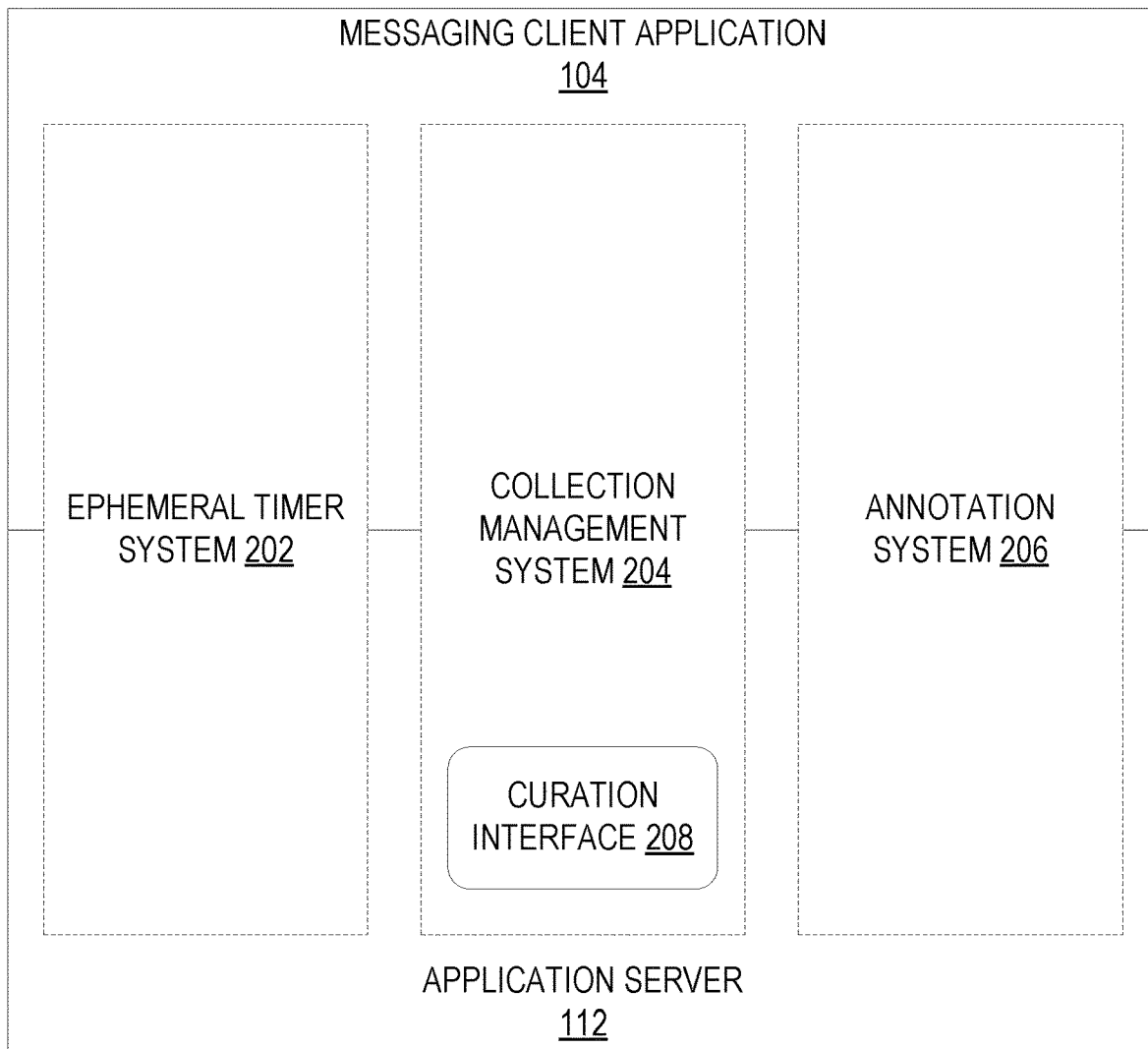
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages (e.g., a story), or graphical element, selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a filter, lens) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects, as well as animated facial models. An example of a visual effect includes color overlaying. The audio and visual content or the visual effects can be applied to a media content item (e.g., a photo or video) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
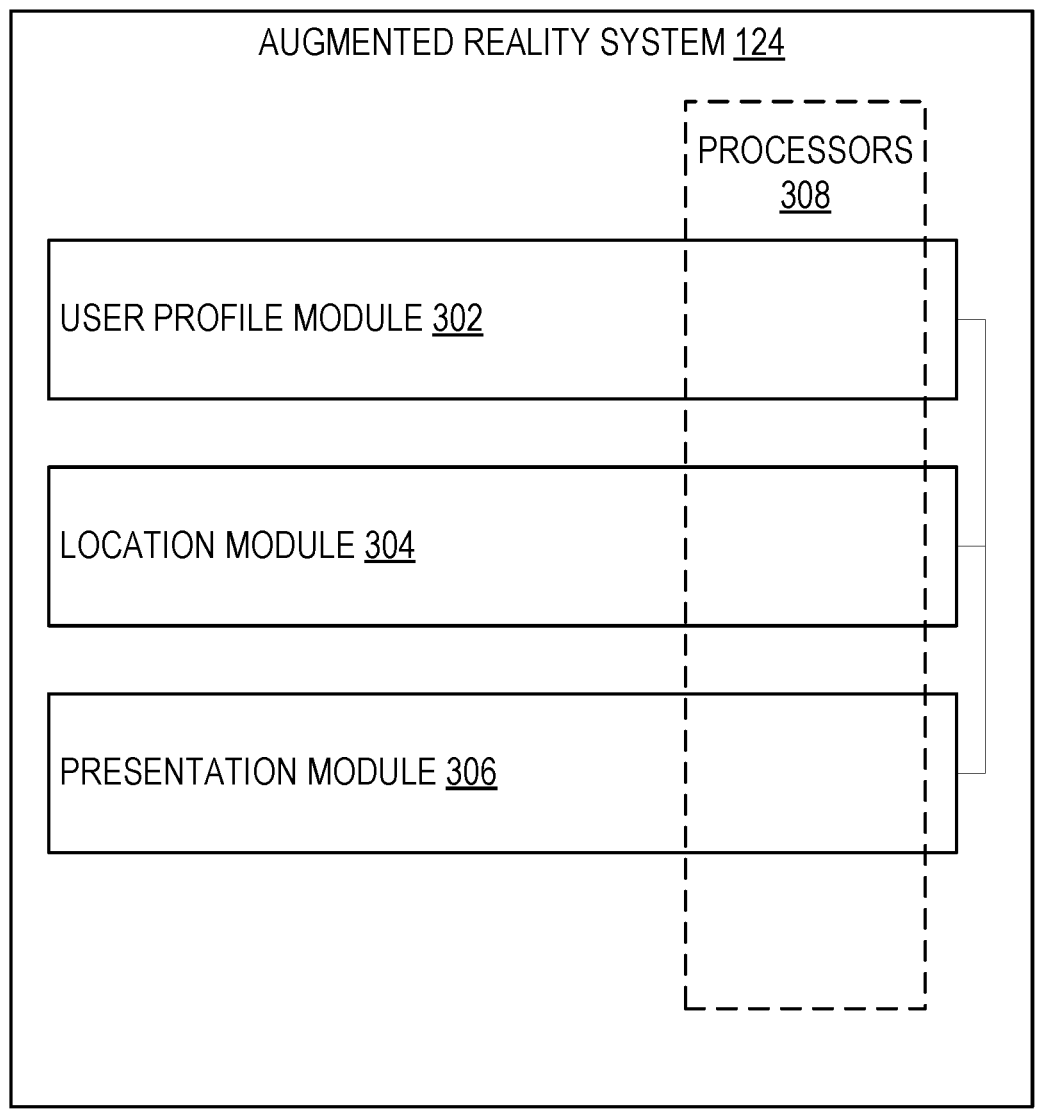
FIG. 3 is a block diagram illustrating various modules of an augmented reality system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a block diagram illustrating components of the shared AR system 124 that configure the shared AR system 124 to perform operations to generate and cause display of a notification based on a classification associated with a user connection, according to certain example embodiments.

The shared AR system 124 is shown as including a user profile module 302, a notification module 304, and a presentation module 306, all configured to communicate with each other (e.g., via a bus, shared memory, or a switch). Any one or more of these modules may be implemented using one or more processors 308 (e.g., by configuring such one or more processors to perform functions described for that module) and hence may include one or more of the processors 308. In certain embodiments, the avatar notification system 124 may include or have access to the database 120, wherein the database 120 may comprise a collection of media content indexed based on user attributes and astrological signs.

Any one or more of the modules described may be implemented using hardware alone (e.g., one or more of the processors 308 of a machine) or a combination of hardware and software. For example, any module described of the avatar notification system 124 may physically include an arrangement of one or more of the processors 308 (e.g., a subset of or among the one or more processors of the machine) configured to perform the operations described herein for that module. As another example, any module of the avatar notification system 124 may include software, hardware, or both, that configure an arrangement of one or more processors 308 (e.g., among the one or more processors of the machine) to perform the operations described herein for that module. Accordingly, different modules of the avatar notification system 124 may include and configure different arrangements of such processors 308 or a single arrangement of such processors 308 at different points in time. Moreover, any two or more modules of the avatar notification system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 4 is a flowchart depicting a method 400 of presenting a shared AR interface at a client device 102, according to certain example embodiments. Operations of the method 400 may be performed by the modules described above with respect to FIG. 3. As shown in FIG. 4, the method 400 includes one or more operations 402, 404, 406, 408, 410, and 412.

At operation 402, the location module 302 accesses image data at the client device 102, wherein the image data comprises a set of image features that define a surface of an object. For example, the image data may be generated by a camera associated with (or communicatively coupled to) the client device 102.

In some embodiments, the image data may include a video stream generated by the client device 102 and presented within a GUI at the client device 102.

At operation 404, the location module 302 determines a position of the client device 102. In some embodiments, the location module 302 may determine the position of the client device 102 based on the set of image features depicted in the image data presented at the client device 102. For example, the set of image features may correspond to a location or landmark within a repository (i.e., the database 120). In some embodiments, the location module 302 may determine the position of the client device 102 based on location data accessed at the client device 102.

The location data may include coordinates that indicate a geographic location of the client device 102, directional data indicating a heading of the client device 102, as well as translational and rotational data indicating an orientation of the client device 102 in six degrees of freedom.

At operation 406, the presentation module 306 causes display of a projection that extends from the position of the client device 102 within a presentation of the image data at the client device 102, wherein the projection has a corresponding trajectory based on the position of the client device 102. For example, the projection may be displayed as a stream of AR paint which the user of the client device 102 may use to virtually paint a surrounding environment of the user presented within the GUI of the client device 102.

In some embodiments, the projection may correspond with a graphical property, such as a color or pattern, which may be associated with a user profile associated with a user of the client device 102.

At operation 408, the presentation module 306 detects an intersection between the projection and a portion of the surface of the object depicted in the image data at the client device 102, wherein the portion of the surface of the object corresponds with attributes that include a set of surface features.

At operation 410, the presentation module 306 generates a request that includes an identification of the portion of the surface of the object at the client device 102, wherein the identification of the portion may include the set of surface features, as well as location data indicating a location of the client device 102.

At operation 412, the presentation module 306 presents the portion of the surface of the object based on the graphical property of the projection. As an illustrative example, the graphical property of the projection may include a specific color or pattern. Responsive to detecting the intersection of the projection with the portion of the surface, the presentation module 306 may display the portion based on the specific color or pattern such that it appears as though the portion was painted with the projection.

Figure 5:
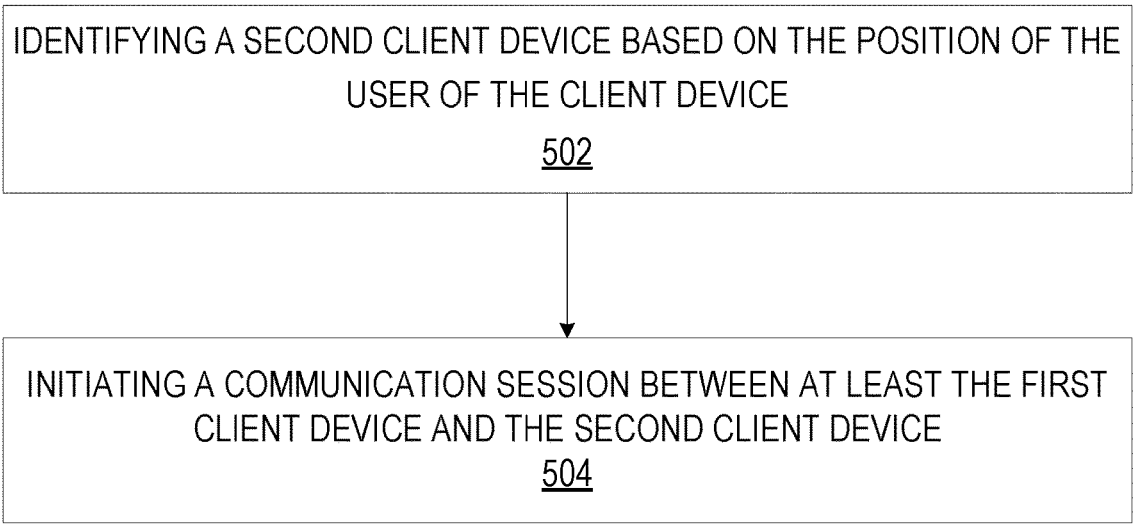
FIG. 5 is a flowchart depicting a method of presenting a shared augmented reality interface, according to certain example embodiments.

FIG. 5 is a flowchart depicting a method 500 of presenting a shared AR interface, according to certain example embodiments. Operations of the method 500 may be performed by the modules described above with respect to FIG. 3. As shown in FIG. 5, the method 500 includes one or more operations 502, and 504. The method 500 may be performed as a part of the method 400 depicted in FIG. 4, for example as a part of one or more of the operations depicted in the method 400. In some embodiments, the method 500 may be performed as a subroutine of operation 404 of the method 400, wherein a position of a client device 102 is determined based on location data and image data.

At operation 502, the location module 304 identifies a second client device 102 based on one or more factors that include the position of the user of the client device 102 (i.e., the first client device 102). The location module 304 may identity client devices within a threshold distance of the position of the first client device 102 or may identify all client devices located within a boundary defined by the location module 304. For example, a boundary may be defined and associated with a location. Responsive to detecting a client device (i.e., the first client device 102) within the boundary associated with the location, the location module 304 may identify a second client device 102 which is also located within the boundary associated with the location.

In such embodiments, associating the boundary with the location may include associating the boundary with one or more landmarks within the location, based on image features associated with the landmarks. In further embodiments, the boundary may include a geo-fence maintained by the location module 304, wherein users are determined to be within the boundary of the geo-fence based on location data which may be accessed at the corresponding devices.

In some embodiments, the location module 304 may identify the client devices based on factors such as user profile data that includes user attributes, and user affinities. For example, responsive to detecting a location of the first client device 102, the location module 304 may identify a user attribute of a user of the first client device 102, and then identify a second client device 102 based on the location of the first client device 102 and the user attribute of the first client device 102.

At operation 504, the user profile module 302 initiates a communication session between at least the first client device 102 and the second client device 102. In some embodiments, initiation of the communication session between the first client device 102 and the second client device 102 may include adding the first client device 102 and the second client device 102 to an existing communication session associated with the location, wherein the existing communication session includes a plurality of client devices which are also located in the boundary associated with the location.

In some embodiments, responsive to identifying the second client device 102, the presentation module 306 may cause display of a notification at the first client device 102, wherein the notification includes an invitation to join a shared communication session with the second client device 102.

In some embodiments, the communication session may include a shared AR interface, wherein actions performed by the user of the first client device 102 (i.e., painting buildings with AR content), is visible via the shared AR interface of the communication session at the second client device 102.

Figure 6:
FIG. 6 is a flowchart depicting a method of presenting augmented reality content in a shared augmented reality interface, according to certain example embodiments.

FIG. 6 is a flowchart depicting a method 600 of presenting AR content in a shared AR interface, according to certain example embodiments. Operations of the method 600 may be performed by the modules described above with respect to FIG. 3. As shown in FIG. 6, the method 600 includes one or more operations 602, and 604. The method 600 may be performed as a part of the method 400 depicted in FIG. 4, for example as a part of one or more of the operations depicted in the method 400. In some embodiments, the method 600 may be performed as a subroutine of operation 404 of the method 400, wherein a position of a client device 102 is determined based on location data and image data.

At operation 602, the user profile module 302 assigns a graphical property from among a plurality of graphical properties to a user profile associated with the client device 102. In certain embodiments, the user profile module 302 may assign the graphical property to the user profile associated with the client device 102 responsive to detecting the location of the client device 102. For example, responsive to determining the location of the client device 102, the user profile module 302 may select a graphical property and assign the graphical property to the user profile associated with the client device 102.

In some embodiments, the user profile module 302 may select the graphical property from among the plurality of graphical properties based on factors that include location attributes of the location, as well as user attributes from the user profile associated with the client device 102.

In some embodiments, the user profile module 302 may select the graphical property from among the plurality of graphical properties based on contextual data associated with the location. For example, the contextual data may include one or more of: a number of client devices which are within a boundary associated with the location; a number of client device which have been assigned a graphical property from among the plurality of graphical properties; and temporal data indicating a time in which the client device 102 entered the boundary associated with the location.

At operation 604, the presentation module 306 generates and causes display of AR content at the client device 102 based on the graphical property assigned to the user profile. For example, the AR content may include a display of a stream of "paint" presented at the client device, wherein the color or pattern of the paint is based on the graphical property associated with the user profile. For example, as seen in the shared AR interface 805 depicted in the interface diagram 800 of FIG. 8, the AR content may include a presentation of a stream of paint, wherein the graphical property of the stream of paint is based on the graphical property assigned to the user profile.

FIG. 7 is a flowchart depicting a method 700 of presenting AR content in a shared AR interface, according to certain example embodiments. Operations of the method 700 may be performed by the modules described above with respect to FIG. 3. As shown in FIG. 7, the method 700 includes one or more operations 702, and 704. The method 700 may be performed as a subroutine of the method 500 depicted in FIG. 5.

At operation 702, the presentation module 306 receives location data that identifies a location of a second client device 102, wherein the location data indicates a position, heading, and orientation of the second client device 102. For example, responsive to assigning the first client device 102 and the second client device 102 to a shared communication session, the presentation module 306 may provide location data that identifies locations of the plurality of client devices party to the shared communication session to each of the client devices in the shared communication session. In some embodiments, the presentation module 306 may identify one or more client devices 102 that are within a threshold distance of the first client device 102.

At operation 704, the presentation module 306 causes display of AR content at the first client device 102, wherein the AR content is based on the location of the second client device 102, and comprises a graphical property (i.e., a second graphical property) based on a graphical property associated with the second client device 102.

Figure 8:
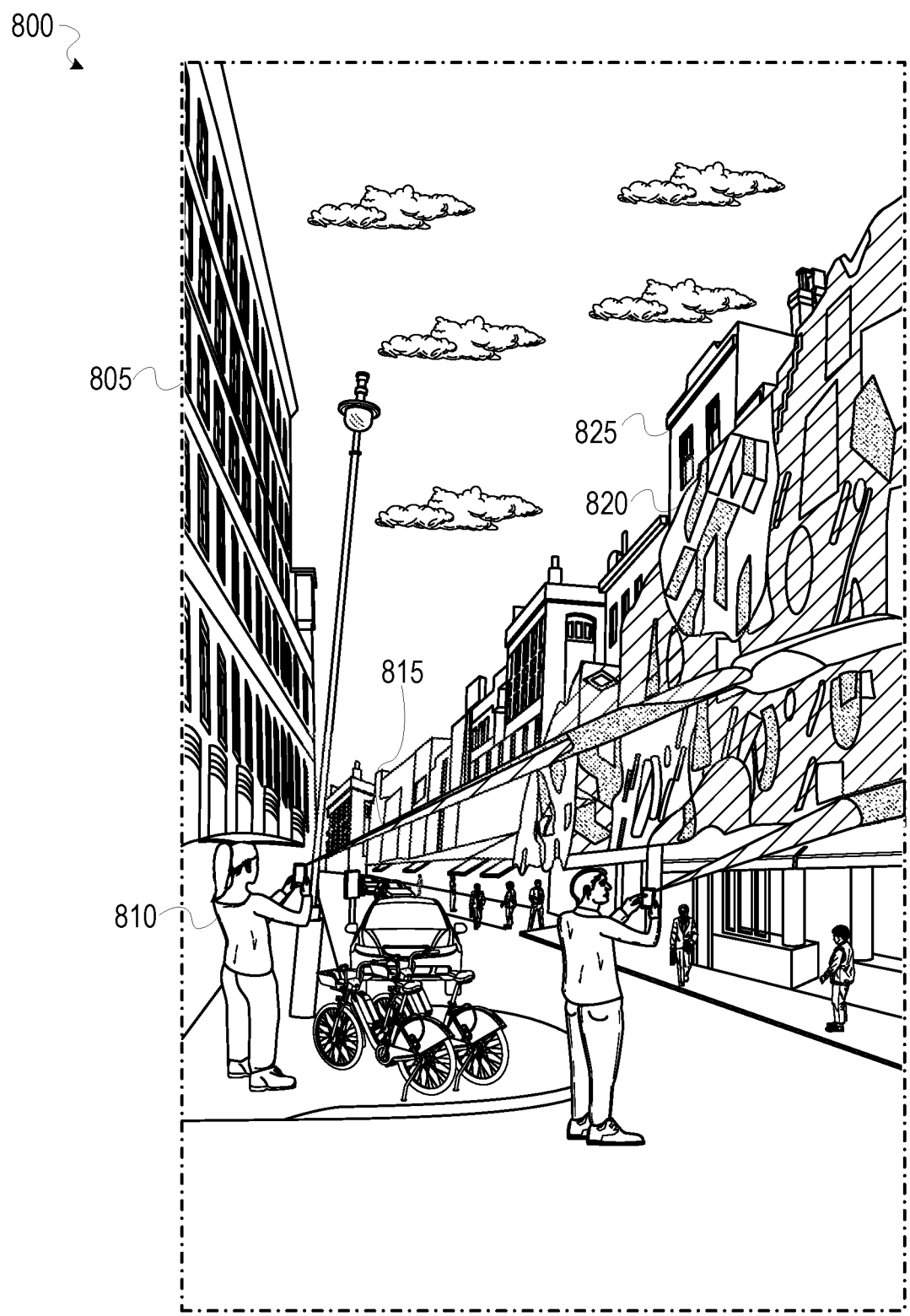
FIG. 8 is an interface diagram depicting a shared augmented reality interface, according to certain example embodiments.

FIG. 8 is an interface diagram 800 depicting a shared AR interface 805 generated and displayed at a client device 102 by a shared AR system 124, according to certain example embodiments.

For example, as seen in the shared AR interface 805 depicted in the interface diagram 800 of FIG. 8, the AR content may include a presentation of a stream of paint 815, wherein a graphical property of the stream of paint 815 is based on the graphical property assigned to a user profile associated with a user (i.e., the user 810), in which the stream of paint 815 originates.

As seen in the interface diagram 800, the AR content may also include the display of a painted surface 820, wherein the graphical properties of the painted surface 820 are based on a graphical property associated with a user profile, and a set of surface features associated with an object, such as the building 825.

As seen in the interface diagram 800, a stream of paint 815 may be presented within the AR interface 805 based on location data from a client device 102 associated with the user 810. For example, the location data may indicate a location of a client device 102, as well as information specifying an orientation of the client device 102 in 6 degrees of freedom. Accordingly, an orientation of the stream of paint 815 may be based on the location data generated at the client device 102 associated with the user 810.

Software Architecture

Figure 9:
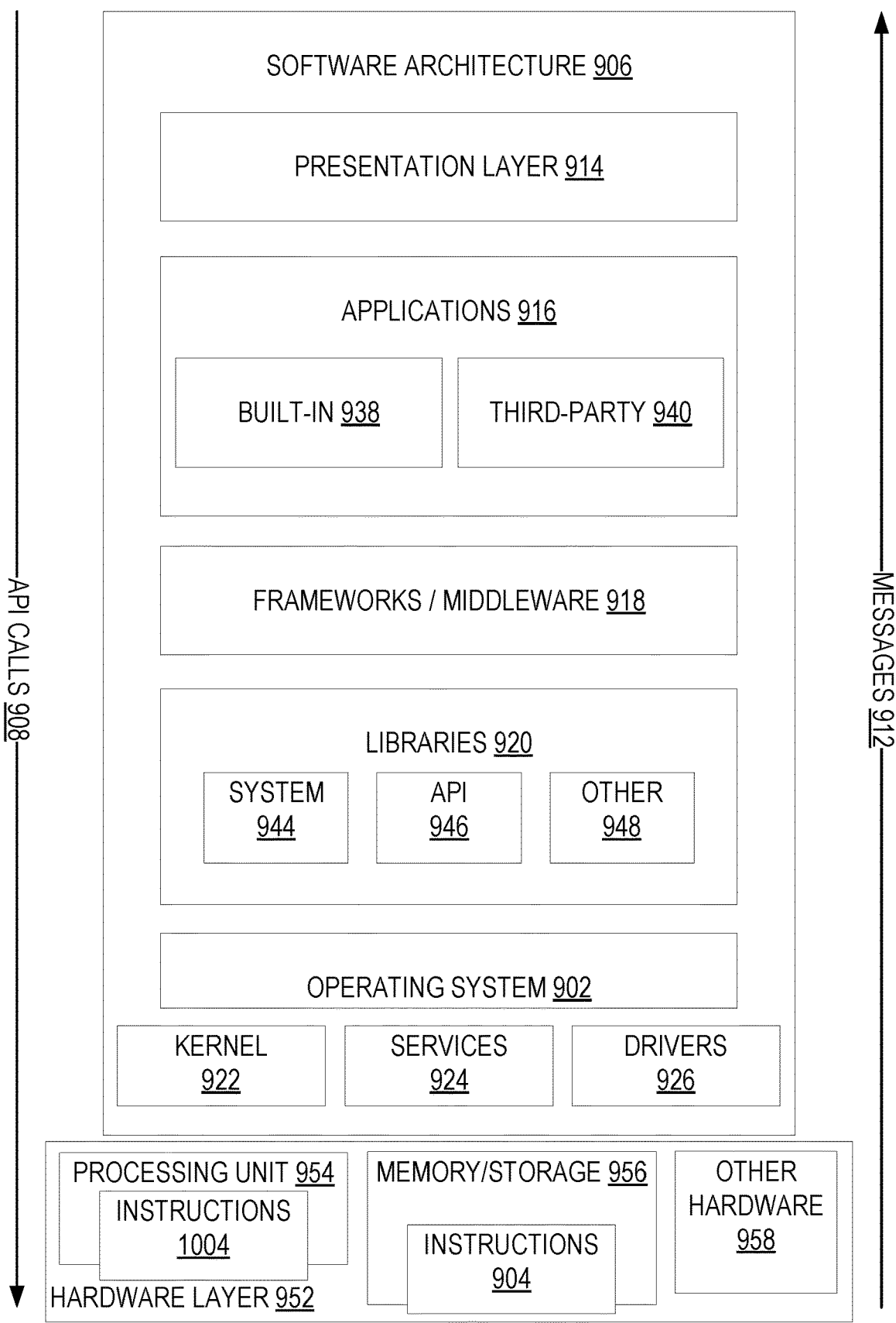
FIG. 9 is a block diagram illustrating a representative software architecture, which may be used in conjunction with various hardware architectures herein described and used to implement various embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 1006 may execute on hardware such as machine 1000 of FIG. 10 that includes, among other things, processors 1004, memory 1014, and I/O components 1018. A representative hardware layer 952 is illustrated and can represent, for example, the machine 900 of FIG. 9. The representative hardware layer 952 includes a processing unit 954 having associated executable instructions 904. Executable instructions 904 represent the executable instructions of the software architecture 906, including implementation of the methods, components and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, applications 916 and a presentation layer 914. Operationally, the applications 916 and/or other components within the layers may invoke application programming interface (API) API calls 908 through the software stack and receive a response as in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924 and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924 and/or drivers 926), libraries 920, and frameworks/middleware 918 to create user interfaces to interact with users of the system. Alternatively, or additionally, in some systems interactions with a user may occur through a presentation layer, such as presentation layer 914. In these systems, the application/component "logic" can be separated from the aspects of the application/component that interact with a user.

Figure 10:
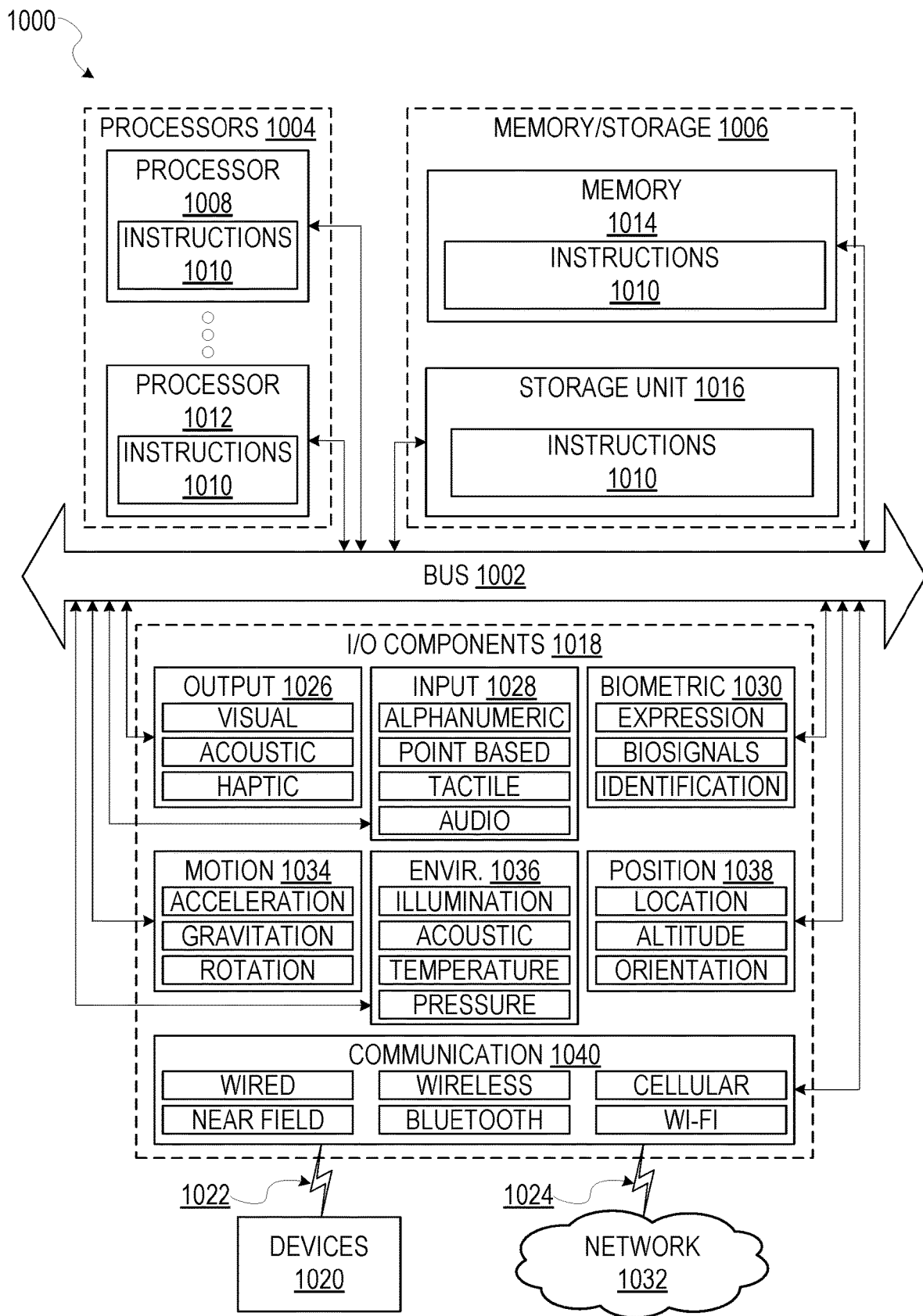
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental environment components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environment components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1022 and coupling 1024 respectively. For example, the communication components 1040 may include a network interface component or other suitable device to interface with the network 1032. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a Universal Serial Bus (USB)).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

"PHONEME ALIGNMENT" in this context, a phoneme is a unit of speech that differentiates one word from another. One phoneme may consist of a sequence of closure, burst, and aspiration events; or, a dipthong may transition from a back vowel to a front vowel. A speech signal may therefore be described not only by what phonemes it contains, but also the locations of the phonemes. Phoneme alignment may therefore be described as a "time-alignment" of phonemes in a waveform, in order to determine an appropriate sequence and location of each phoneme in a speech signal.

"AUDIO-TO-VISUAL CONVERSION" in this context refers to the conversion of audible speech signals into visible speech, wherein the visible speech may include a mouth shape representative of the audible speech signal.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A method comprising:
   accessing image data at a client device, the image data comprising a set of image features, the set of image features defining a surface of an object;
   determining a position of a user of the client device based on the set of image features;
   causing display of a projection that extends from the position of the user upon a presentation of the image data at the client device, the projection comprising a graphical property and having a trajectory based on the position of the user of the client device;
   detecting an intersection of the projection and the surface of the object based on the trajectory, the intersection corresponding with a portion of the surface of the object:
   generating a request that includes an identification of the portion of the surface of the object at the client device; and
   presenting the portion of the surface of the object based on the graphical property of the projection at the client device in response to the request that includes the identification of the portion of the surface of the object.

2. The method of claim 1, wherein the client device is a first client device, and the method further comprises:
   identifying a second client device based on the position of the user of the client device; and
   initiating a communication session between at least the first client device and the second client device.

3. The method of claim 2, wherein the graphical property of the projection is a first graphical property, and the method further comprises:
   receiving, at the first client device, location data that identifies a location of the second client device, the location data indicating a heading of the second client device; and
   causing display of media content at the first client device, the media content comprising a second graphical property associated with the second client device.

4. The method of claim 1, wherein the method further comprises:
   receiving an input at the client device; and
   causing display of the projection that extends from the position of the user upon the presentation of the image data at the client device in response to the input.

5. The method of claim 1, wherein the position indicates a heading of the user, and wherein the trajectory of the projection is based on at least the heading of the user.

6. The method of claim 1, wherein the surface of the object comprises a total area, and the attribute of the portion of the surface of the object includes an area of the portion, and the method further comprises:
   determining a value based on a ratio of the area of the portion and the total area; and
   causing display of the value at the client device.

7. The method of claim 1, wherein the graphical property includes a color associated with a user profile.

8. The method of claim 1, wherein the method further comprises:
   assigning a graphical property from among a plurality of graphical properties to a user profile associated with the client device in response to the determining the position of the user of the client device based on the set of image features; and
   wherein the causing display of the projection is based on the graphical property.

9. A system comprising:
   a memory; and
      at least one hardware processor coupled to the memory and comprising instructions that causes the system to perform operations comprising:
      accessing image data at a client device, the image data comprising a set of image features, the set of image features defining a surface of an object;
      determining a position of a user of the client device based on the set of image features;
      causing display of a projection that extends from the position of the user upon a presentation of the image data at the client device, the projection comprising a graphical property and having a trajectory based on the position of the user of the client device;
      detecting an intersection of the projection and the surface of the object based on the trajectory, the intersection corresponding with a portion of the surface of the object;
      generating a request that includes an identification of the portion of the surface of the object at the client device; and
      presenting the portion of the surface of the object based on the graphical property of the projection at the client device in response to the request that includes the identification of the portion of the surface of the object.

10. The system of claim 9, wherein the client device is a first client device, and the operations further comprise:
    identifying a second client device based on the position of the user of the client device; and
    initiating a communication session between at least the first client device and the second client device.

11. The system of claim 10, wherein the graphical property of the projection is a first graphical property, and the method further comprises:
    receiving, at the first client device, location data that identifies a location of the second client device, the location data indicating a heading of the second client device, and
    causing display of media content at the first client device, the media content comprising a second graphical property associated with the second client device.

12. The system of claim 9, wherein the operations further comprise:
    receiving an input at the client device; and causing display of the projection that extends from the position of the user upon the presentation of the image data at the client device in response to the input.

13. The system of claim 9, wherein the position indicates a heading of the user, and wherein the trajectory of the projection is based on at least the heading of the user.

14. The system of claim 9, wherein the surface of the object comprises a total area, and the attribute of the portion of the surface of the object includes an area of the portion, and the operations further comprise:
   determining a value based on a ratio of the area of the portion and the total area; and
   causing display of the value at the client device.

15. The system of claim 14, wherein the graphical property includes a color associated with a user profile.

16. The system of claim 9, wherein the operations further comprise:
   assigning a graphical property from among a plurality of graphical properties to a user profile associated with the client device in response to the determining the position of the user of the client device based on the set of image features; and
   wherein the causing display of the projection is based on the graphical property.

17. A non-transitory machine-readable storage medium comprising instructions that, when executed by one or more processors of a machine, cause the machine to perform operations comprising:
   accessing image data at a client device, the image data comprising a set of image features, the set of image features defining a surface of an object;
   determining a position of a user of the client device based on the set of image features;
   causing display of a projection that extends from the position of the user upon a presentation of the image data at the client device, the projection comprising a graphical property and having a trajectory based on the position of the user of the client device;
   detecting an intersection of the projection and the surface of the object based on the trajectory, the intersection corresponding with a portion of the surface of the object;
   generating a request that includes an identification of the portion of the surface of the object at the client device; and
   presenting the portion of the surface of the object based on the graphical property of the projection at the client device in response to the request that includes the identification of the portion of the surface of the object.

18. The non-transitory machine-readable storage medium of claim 17, wherein the client device is a first client device, and the operations further comprise:
   identifying a second client device based on the position of the user of the client device; and
   initiating a communication session between at least the first client device and the second client device.

19. The non-transitory machine-readable storage medium of claim 17, wherein the graphical property of the projection is a first graphical property, and the operations further comprise:
   receiving, at the first client device, location data that identifies a location of the second client device, the location data indicating a heading of the second client device; and
   causing display of media content at the first client device, the media content comprising a second graphical property associated with the second client device.

20. The non-transitory machine-readable storage medium of claim 17, wherein the operations further comprise:
   receiving an input at the client device; and
   causing display of the projection that extends from the position of the user upon the presentation of the image data at the client device in response to the input.

* * * * *

UNITED STATES PATENT AND TRADEMARK OFFICE
CERTIFICATE OF CORRECTION

PATENT NO. : 10,956,743 B1  
APPLICATION NO. : 16/833087  
DATED : March 23, 2021  
INVENTOR(S) : Li et al.

Page 1 of 1

It is certified that error appears in the above-identified patent and that said Letters Patent is hereby corrected as shown below:

In the Claims

In Column 19, Line 38, in Claim 1, delete "object:" and insert --object;-- therefor In Column 20, Line 61, in Claim 11, delete "device," and insert --device;-- therefor Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*